No. 887,002. PATENTED MAY 5, 1908.
J. E. MARRINER.
CUSHION ATTACHMENT FOR AUTOMOBILES.
APPLICATION FILED JAN. 7, 1907.
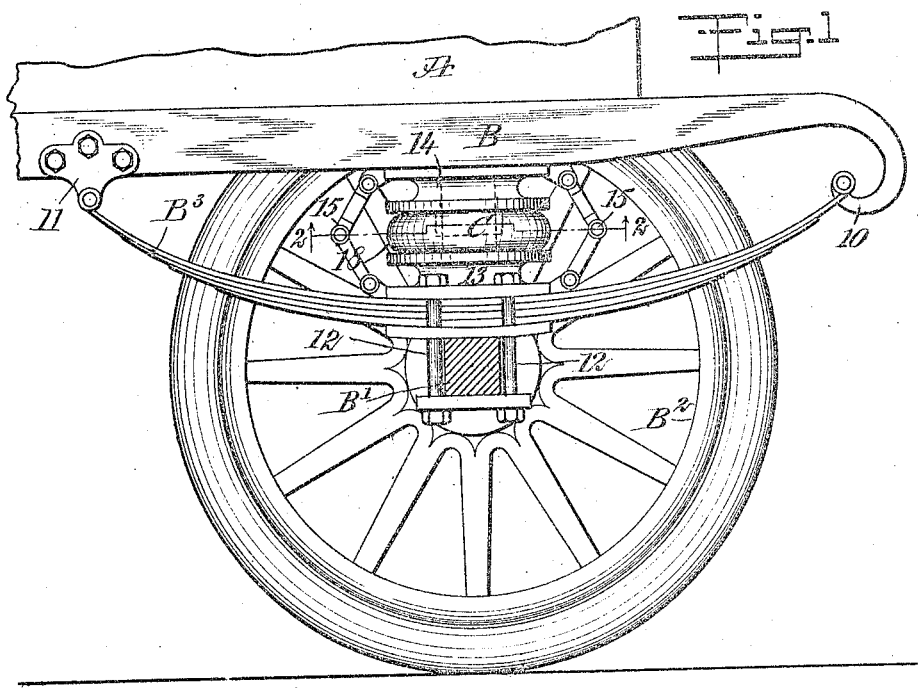
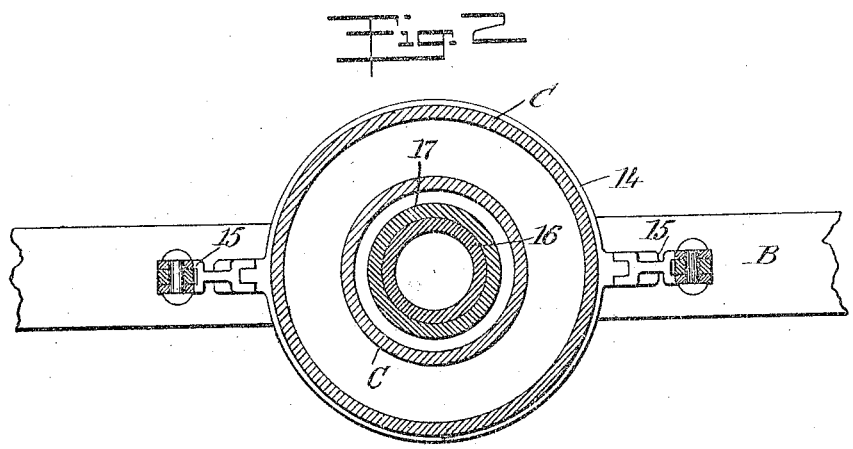
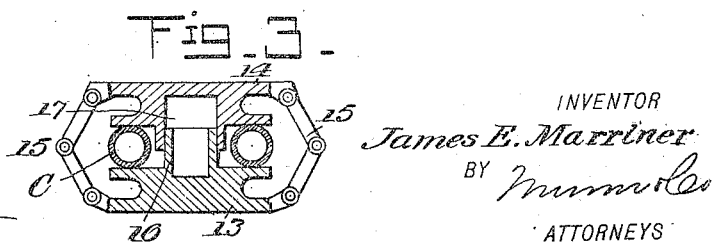
INVENTOR
James E. Marriner
BY
ATTORNEYS

UNITED STATES PATENT OFFICE.

JAMES E. MARRINER, OF NEWTON, MASSACHUSETTS.

CUSHION ATTACHMENT FOR AUTOMOBILES.

No. 887,002.    Specification of Letters Patent.    Patented May 5, 1908.

Application filed January 7, 1907. Serial No. 351,120.

*To all whom it may concern:*

Be it known that I, JAMES E. MARRINER, a citizen of the United States, and a resident of Newton, in the county of Middlesex and State of Massachusetts, have invented a new and useful Improvement in Cushion Attachments for Automobiles and the Like, of which the following is a full, clear, and exact description.

The purpose of the invention is to provide a cushion body support for automobiles and other vehicles of like type, cars, car-seats, etc., which device is simple, durable, economic and capable of convenient and expeditious application.

A further purpose of the invention is to provide independent inflatable or resilient ring-cushions for a vehicle or other object, whereby injury to one device will not affect the others, and to so locate the cushions that they are absolutely free from lateral motion.

It is also a purpose of the invention to so construct the device that a safe support will be provided for the vehicle even should all of the pneumatic cushions become deflated.

Another purpose of the invention is to provide a construction whereby ready access may be had to the ring cushions for inflation, and whereby upon simply jacking up the vehicle and disconnecting a few readily accessible parts a worn or damaged cushion can be quickly and readily removed and replaced.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a vertical section through the axle of an automobile, showing an improved cushion applied; Fig. 2 is an enlarged horizontal section taken practically on the line 2—2 of Fig. 1, and Fig. 3 is a detail sectional view.

A represents a portion of the body of an automobile, B one of the longitudinal supporting-bars therefor, and B' represents an axle provided with the customary wheels B², while B³ represents one of the semi-elliptical springs employed, one terminal of which spring is attached to the downwardly curved outer end of the supporting-bar B, beneath which the spring is located, while the other terminal of the spring is pivoted to a bearing 11 bolted or otherwise secured to the supporting-bar B, as is clearly shown in Fig. 1. The central portion of the spring B³ rests upon the axle B' and is secured thereto by means of bolts 12 or their equivalents. This arrangement of body, spring, axle, etc., is no part of the improvement claimed but is employed for illustrative purposes only.

Opposing socket-blocks 13 and 14 are employed in the construction of each cushion support, the socket-block 13, which is the lower one, being attached to the spring B³, usually by means of the aforesaid bolts 12, while the upper socket-block 14 is secured in any suitable or approved manner to the under face of the body supporting-bar B. The opposing faces of the socket-blocks 13 and 14 are in vertical registry. These socket-blocks 13 and 14 receive between them and are in engagement with an inflatable or resilient cushion C, preferably made of rubber or rubber associated with other material. The socket-blocks 13 and 14 are prevented from separating to such an extent as to release the cushion-ring C between them, by means of toggles 15, located at opposite sides of the socket-blocks 13 and 14, one member of each toggle being pivotally connected with the upper socket-block 14 and the other member of each toggle is pivotally connected with the lower socket-block 13, as is also best shown in Fig. 1.

It is very necessary that while the cushion-ring C shall act in a vertical direction it is also necessary to prevent the movement of the cushion-ring in a horizontal or lateral direction thereto.

A cylinder 17 open at its inner end extends down from the under face of the upper socket-block 14 through the space surrounded by the inner contour of the cushion ring, and this cylinder 17 freely receives the piston 16 that extends up from the upper face of the lower socket-block 13, the cylinder 17 sliding on the piston 16.

The piston and the cylinder, while they assist the cushion C in connection with which they are employed, in taking up shock, are essentially employed as guide devices, preventing the cushion devices from having lateral movement, while the toggles 15 limit the vertical movement of the devices.

A suitable valve is employed in connection with each of the ring-cushions, to inflate the same—

Having thus described my invention, I claim as new and desire to secure by Letters Patent:

1. The combination with a longitudinal supporting bar of a vehicle body, the axle, and a spring secured at its center to the upper face of the axle and having its ends secured to said bar, of a socket block secured upon the upper face of the spring directly above the axle by the means securing the spring to said axle and having a hollow piston projecting upward therefrom, a second socket block secured to the lower face of the supporting bar and having a cylinder projecting downwardly therefrom freely receiving the piston, a cushion ring between the socket blocks and surrounding the piston and cylinder of the socket blocks, and toggles connecting the socket blocks at diametrically opposite sides, between the supporting bar and spring.

2. In a cushion support for vehicles, oppositely arranged blocks, each having oppositely arranged ears, one block being provided on its inner face with a cylinder open at its inner end and the other with a piston, the piston fitting snugly in the cylinder and disconnected therefrom, a cushion ring between the blocks and surrounding the cylinder and piston, and toggles connecting the blocks at opposite sides, each toggle consisting of links pivoted together and to the ears of said blocks.

In testimony whereof I have signed my name to this specification in the presence of two subscribing witnesses.

JAMES E. MARRINER.

Witnesses:
THOMAS D. CHURCHILL,
RAYMOND F. TOZIER.